United States Patent
Laumen et al.

(10) Patent No.: US 7,386,300 B2
(45) Date of Patent: Jun. 10, 2008

(54) METHOD FOR ASSIGNING A PRIORITY MECHANISM TO AT LEAST ONE GROUP OF TLV-OBJECTS

(75) Inventors: Josef Laumen, Hildesheim (DE); Andreas Schmidt, Braunschweig (DE); Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 112 days.

(21) Appl. No.: 10/514,651

(22) PCT Filed: May 6, 2003

(86) PCT No.: PCT/EP03/04753

§ 371 (c)(1),
(2), (4) Date: Nov. 15, 2004

(87) PCT Pub. No.: WO03/098950

PCT Pub. Date: Nov. 27, 2003

(65) Prior Publication Data

US 2005/0191993 A1 Sep. 1, 2005

(51) Int. Cl.
H04M 11/00 (2006.01)
(52) U.S. Cl. .............................. 455/412.1; 455/412.2
(58) Field of Classification Search ................ 455/450, 455/422.1, 403, 517, 557, 509, 456.1, 456.2, 455/456.3, 404.2, 412.1, 412.2, 466; 370/328, 370/389
See application file for complete search history.

(56) References Cited

U.S. PATENT DOCUMENTS

| | | | |
|---|---|---|---|
| 2002/0057717 A1* | 5/2002 | Mallory | 370/503 |
| 2002/0115421 A1* | 8/2002 | Shahar et al. | 455/403 |
| 2003/0179726 A1* | 9/2003 | Forssell et al. | 370/328 |
| 2003/0206559 A1* | 11/2003 | Trachewsky et al. | 370/509 |
| 2004/0072573 A1* | 4/2004 | Shvodian | 455/450 |
| 2005/0003831 A1* | 1/2005 | Anderson | 455/456.1 |
| 2005/0130673 A1* | 6/2005 | Annamalai | 455/456.2 |
| 2005/0159163 A1* | 7/2005 | Chang et al. | 455/450 |

OTHER PUBLICATIONS

Universal Mobile Telecommunications System (UMTS); Characteristics of the USIM Application 93GPP TS 31.102 version 0.0 Release 5) Mar. 2002 pp. 1-140.
"Change Request 22.140 CR 015" Technical Specification Group Services and System Aspects Mar. 11-14, 2002, pp. 1-2.
XP-002215660—3GPP TS 31.102 V3.30 (Release 1999) Characteristics of the USM Application, Mar. 2003.

* cited by examiner

Primary Examiner—Naghmeh Mehrpour
(74) Attorney, Agent, or Firm—Bell, Boyd & Lloyd LLP (57) ABSTRACT

Method for assigning a priority mechanism to a least one group of TLV-objects (TLVO1-TLVO3) for data exchange between a transmitting and receiving entity, for storing data on, and/or for reading data from a storage medium by assigning a structure (ST) for TLV-objects in the transmitting and receiving entity; and/or on the storage medium.

19 Claims, 7 Drawing Sheets

FIG 1A

| Identifier: '6FD0' | Structure: Transparent | Optional |
|---|---|---|
| File Size: X bytes | Update activity: low | |

| Access Conditions: | | | |
|---|---|---|---|
| READ | PIN | | |
| UPDATE | ADM/PIN2 | | |
| | (fixed during administrative management) | | |
| DEACTIVATE | ADM | | |
| ACTIVATE | ADM | | |

| Bytes | Description | M/O | Length |
|---|---|---|---|
| 1 to X | MMS Connectivity Parameters TLV objects | M | X bytes |

MMS Connectivity Parameters tags:

| Description | Tag Value |
|---|---|
| MMS Connectivity Parameters Tag | 'AB' |
| MMS Implementation Tag | '80' |
| MMS Relay/Server Tag | '81' |
| Interface to Core Network and Bearer Tag | '82' |
| Gateway Tag | '83' |

FIG 1B

MMS Connectivity Pramameters contents

| Description | Value | M/O | Length (bytes) |
|---|---|---|---|
| MMS Connectivity Parameters Tag | 'AX' | M | 1 |
| Length | Note1 | M | Note 2 |
| MMS Implementation Tag | '80' | M | 1 |
| Length | 1 | M | Note 2 |
| MMS Implementation Information | -- | M | 1 |
| MMS Relay/Server Tag | '81' | M | 1 |
| Length | X | M | Note 2 |
| MMS Relay/Server Adress | -- | M | X |
| Interface to Core Network and Bearer Tag | '82' | M | 1 |
| Length | Y | M | Note 2 |
| Interface to Core Network and Bearer Information | -- | M | Y |
| Gateway Tag | '83' | O | 1 |
| Length | Z | O | Note 2 |
| Gateway Information | -- | O | Z |
| Note 1: This is the total size of the constructed TLV object<br>Note 2: The length is coded according to ISO/IEC 8825 [35] | | | |

FIG 2

| Tag | 1st MMS Connectivity Parameters (highest priority) | ST |
|---|---|---|
| Length | | |
| Value VAL1 | Tag — MMS Implementation A<br>Length — MMS Implementation A<br>Value — MMS Implementation A | TLV 11 |
| | Tag — MMS Relay/Server A<br>Length — MMS Relay/Server A<br>Value — MMS Relay/Server A | TLV 21 |
| | Tag — Interface to Core Network and Bearer A<br>Length — Interface to Core Network and Bearer A<br>Value — Interface to Core Network and Bearer A | TLV 31 |
| | Tag — Gateway A<br>Length — Gateway A<br>Value — Gateway A | TLV 41 |

TLV01

| Tag | 2nd MMS Connectivity Parameters |
|---|---|
| Length | |
| Value | Tag — MMS Implementation A<br>Length — MMS Implementation A<br>Value — MMS Implementation A<br>Tag — MMS Relay/Server A<br>Length — MMS Relay/Server A<br>Value — MMS Relay/Server A<br>Tag — Interface to Core Network and Bearer B<br>Length — Interface to Core Network and Bearer B<br>Value — Interface to Core Network and Bearer B<br>Tag — Gateway A<br>Length — Gateway A<br>Value — Gateway A |

TLV02

| Tag | 3rd MMS Connectivity Parameters (lowest priority) |
|---|---|
| Length | |
| Value | Tag — MMS Implementation A<br>Length — MMS Implementation A<br>Value — MMS Implementation A<br>Tag — MMS Relay/Server A<br>Length — MMS Relay/Server A<br>Value — MMS Relay/Server A<br>Tag — Interface to Core Network and Bearer C<br>Length — Interface to Core Network and Bearer C<br>Value — Interface to Core Network and Bearer C<br>Tag — Gateway A<br>Length — Gateway A<br>Value — Gateway A |

TLV03

FIG 3A

| Identifier: '6FD0' | Structure: Transparent | Optional |
|---|---|---|
| File Size: X bytes | Update activity: low ||
| Access Conditions:<br>    READ          PIN<br>    UPDATE     ADM/PIN2<br>                     (fixed during administrative management)<br>    DEACTIVATE ADM<br>    ACTIVATE   ADM ||||

| Bytes | Description | M/O | Length |
|---|---|---|---|
| 1 to X | 1st MMS Connectivity Parameters TLV objects (highest priority) | M | X bytes |
| 1 to X | 2nd MMS Connectivity Parameters TLV objects | O | X bytes |
| ... | ... | ... | ... |
| 1 to X | nth MMS Connectivity Parameters TLV objects (lowest priority) | O | X bytes |

FIG 3B

MMS Connectivity Parameters tags

| Description | Tag Value |
|---|---|
| MMS Connectivity Parameters Tag | 'AB' |
| MMS Implementation Tag | '80' |
| MMS Relay/Server Tag | '81' |
| Interface to Core Network and Bearer Tag | '82' |
| Gateway Tag | '83' |

MMS Connectivity Pramameters contents

| Description | Value | M/O | Length (bytes) |
|---|---|---|---|
| MMS Connectivity Parameters Tag | 'AX' | M | 1 |
| Length | Note 1 | M | Note 2 |
| MMS Implementation Tag | '80' | M | 1 |
| Length | 1 | M | Note 2 |
| MMS Implementation Information | -- | M | 1 |
| MMS Relay/Server Tag | '81' | M | 1 |
| Length | X | M | Note 2 |
| MMS Relay/Server Adress | -- | M | X |
| Interface to Core Network and Bearer Tag | '82' | M | 1 |
| Length | Y | M | Note 2 |
| Interface to Core Network and Bearer Information | -- | M | Y |
| Gateway Tag | '83' | O | 1 |
| Length | Z | O | Note 2 |
| Gateway Information | -- | O | Z |
| Note 1: This is the total size of the constructed TLV object<br>Note 2: The length is coded according to ISO/IEC 8825 [35] | | | |

FIG 4

| Tag | MMS Connectivity Parameters | |
|---|---|---|
| Length | | |
| Value | Tag | MMS Implementation |
| | Length | MMS Implementation |
| | Value | MMS Implementation |
| | Tag | MMS Relay/Server |
| | Length | MMS Relay/Server |
| | Value | MMS Relay/Server |
| | Tag | Interface to Core Network and Bearer | ← TLV0
| | Length | Interface to Core Network and Bearer |
| | Value | Interface to Core Network and Bearer | ← VALF SE → 
| Tag | 1st Interface to Core Network and Bearer (highest priority) |
|---|---|
| Length | 1st Interface to Core Network and Bearer (highest priority) | ← SE1
| Value | 1st Interface to Core Network and Bearer (highest priority) |
| Tag | 2nd Interface to Core Network and Bearer |
| Length | 2nd Interface to Core Network and Bearer | ← SE2
| Value | 2nd Interface to Core Network and Bearer |
| ⋮ | |
| Tag | nth Interface to Core Network and Bearer (lowest priority) |
| Length | nth Interface to Core Network and Bearer (lowest priority) | ← SEn
| Value | nth Interface to Core Network and Bearer (lowest priority) |

| Tag | Gateway |
|---|---|
| Length | Gateway |
| Value | Gateway |

FIG 5A

| Identifier: '6FD0' | Structure: Transparent | Optional |
|---|---|---|
| File Size: X bytes | Update activity: low | |
| Access Conditions:<br>    READ        PIN<br>    UPDATE    ADM/PIN2<br>                      (fixed during administrative management)<br>    DEACTIVATE  ADM<br>    ACTIVATE    ADM | | |

| Bytes | Description | M/O | Length |
|---|---|---|---|
| 1 to X | MMS Connectivity Parameters TLV objects | M | X bytes |

MMS Connectivity Parameters tags

| Description | Tag Value | |
|---|---|---|
| MMS Connectivity Parameters Tag | 'AB' | ⎫ TV |
| MMS Implementation Tag | '80' | |
| MMS Relay/Server Tag | '81' | |
| Interface to Core Network and Bearer Tag | '82' | |
| 1st Interface to Core Network and Bearer Tag (highest priority) | '9x' | ⎫ |
| 2nd Interface to Core Network and Bearer Tag | '9x' | ⎬ SN |
| ⋮ | ⋮ | |
| nth Interface to Core Network and Bearer Tag (lowest priority) | '9x' | ⎭ |
| Gateway Tag | '83' | |

METHOD FOR ASSIGNING A PRIORITY MECHANISM TO AT LEAST ONE GROUP OF TLV-OBJECTS

BACKGROUND OF THE INVENTION

The standardization body 3GPP TSG SA1, which is responsible for the definition of general MMS service aspects (see 3GPP TS 22.140, Multimedia Messaging Service (MMS); Service Aspects; Stage 1 (Release 5)), has approved new requirements for (automatic) bearer selection in MMS (Multimedia Messaging Service). According to these requirements, an MMS-capable UE (=User Equipment: e.g., a mobile phone) shall be able to automatically select a bearer from a list of different sets of Interface to Core Network and Bearer parameters stored in the USIM (UMTS Subscriber Identity Module) based on their order of precedence. When automatic selection of bearers is disabled, the user shall be able to select a bearer manually from the Interface to Core Network and Bearer parameters. Furthermore, it is also desirable that the switch to a less preferred bearer, in case the most preferred is not available, takes place without any user intervention. Network operators and users will benefit from the usage of the most suitable bearer for the delivery and submission of Multimedia Messages. Currently, in the 3GPP USIM specification TS 31.102, there is no way to express any order of precedence with the storage of Interface to Core Network and Bearer parameters and, thus, the new standardization requirements cannot be met.

The present invention aims to bring a solution to the above-described problem. It preferably defines two alternative, advantageous mechanisms to prioritize a list of TLV objects, and two corresponding mechanisms for automatic bearer selection from the MMS Interface to Core Network and Bearer parameters based on their order of precedence.

Nowadays, in mobile networks like GSM (Global System for Mobile Communications), SMS (Short message Service) is used to send and receive short messages between mobile terminals. Currently, a new messaging service, the so-called MMS (Multimedia Messaging Service) is being standardized. Contrary to SMS, MMS messages may contain multimedia elements such as, for example, text, image, audio or video.

MMS is a peer-to-peer messaging service between two MMS User Agents which are both connected to an MMS Relay/Server. The User Agent resides either on a mobile phone, such as a UMTS-UE (User Equipment) or a GSM-MS (Mobile Station), on an external device, such as a notebook/laptop, connected to a mobile phone, or even on a PC. It is preferable an application layer function that provides the user with the ability to view, compose and handle the Multimedia Messages (=MMs); for example, the submitting and receiving of MMs. The MMS Relay/Server is a network entity responsible for the storage and handling of incoming and outgoing messages and for the transfer of messages between different messaging systems. In general terms, there is a data exchange between such a transmitting and receiving entity.

Mobile communication services such as the $2^{nd}$ generation (e.g., GSM (Global System for Mobile Communications)) and the $3^{rd}$ generation, (e.g., UMTS (Universal Mobile Telecommunication Service) preferably use well-defined smart cards in addition to mobile phones. Plugged into a mobile phone, these smart cards enable a user to use the mobile communication service he/she has subscribed to. Moreover, user preferences and settings as well as a user's personal information can be stored on such smart cards. In GSM these cards are called SIM (Subscriber Identity Module). In UMTS one distinguishes between the physical card which is called UICC (Universal IC Card; IC: Integrated Circuit) and its logical functionality, the USIM (UMTS Subscriber Identity Module).

Figure 1A:
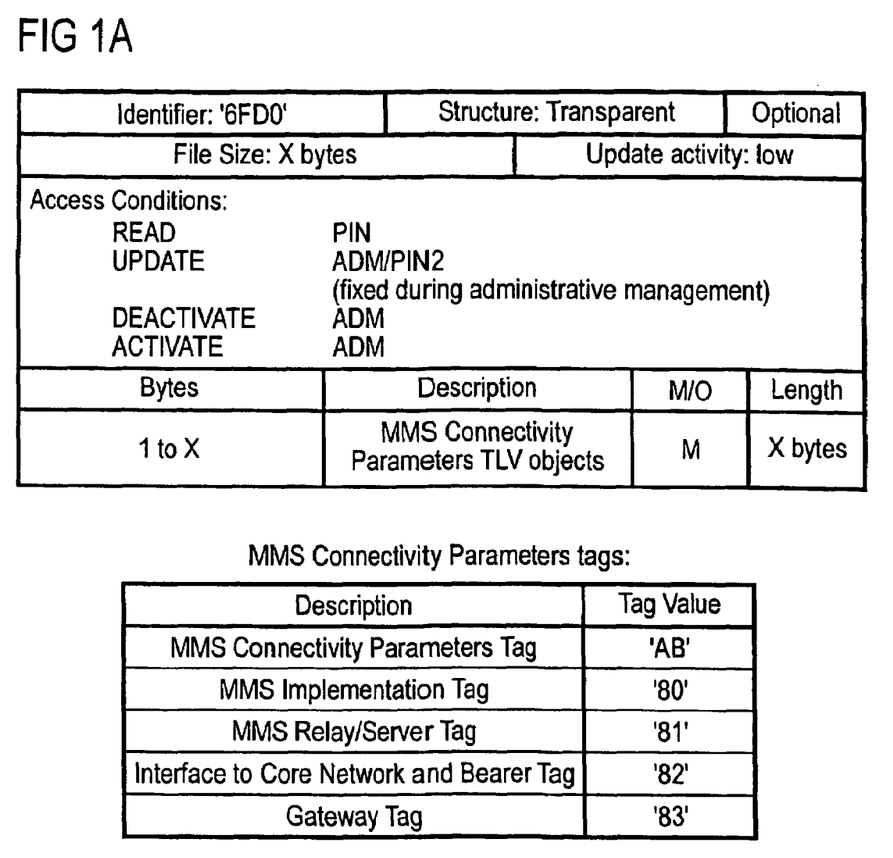
Figure 1B:
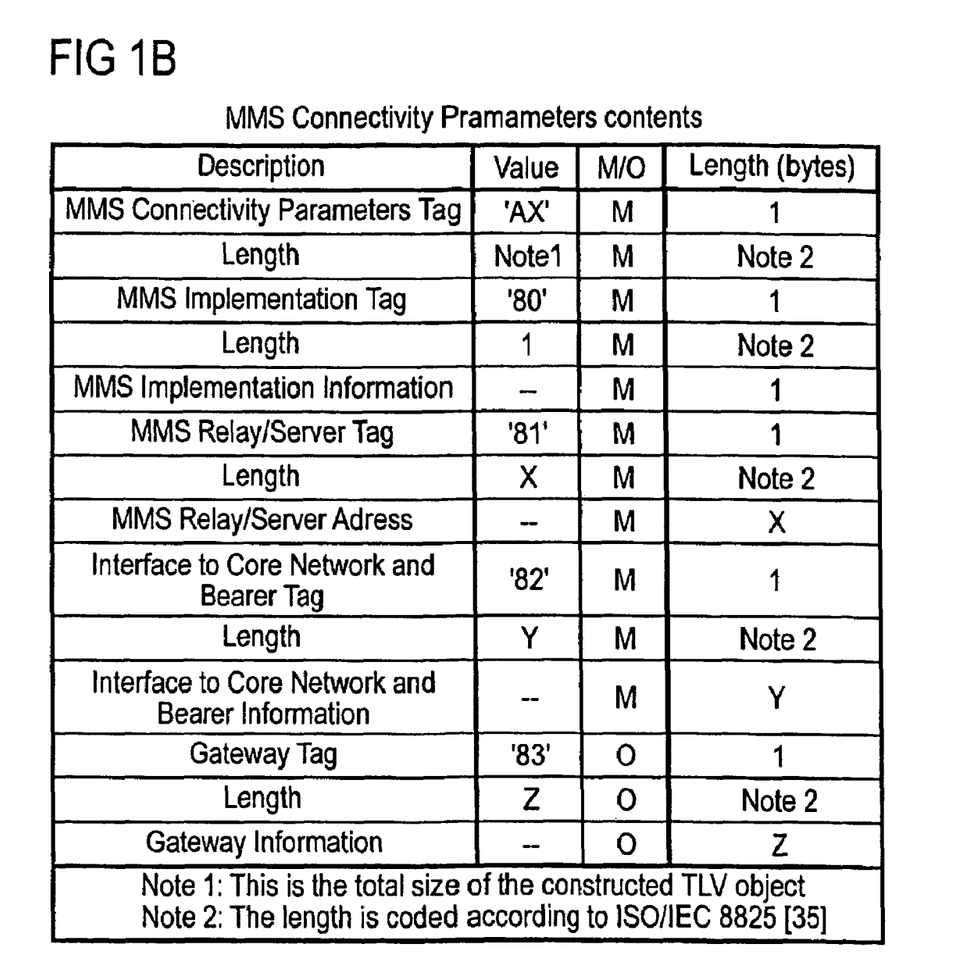

An Elementary File for MMS Connectivity Parameters (=EFMMSCP) is defined on the USIM. This EF (Elementary File) contains values for Multimedia Messaging Connectivity Parameters, which can be used by the ME for user assistance in preparation of connecting to the network for the MMS purpose. The EFMMSCP is present, when the MMS service in the USIM service table is "available." This EFMMSCP is shown in FIG. 1.

The EFMMSCP is an transparent file (for example, on a storage medium like a smart card), where the MMS connectivity parameters are stored in sequential order. To make searching and reading out of the parameters easier, the parameters are stored by making use of the so-called, constructed TLV (Tag, Length, Value) object structure. The MMS Connectivity Parameters consist of MMS implementation, which indicates the used implementation (e.g., WAP), the MMS Relay/Server address, a set of Interface to Core Network and Bearer Information including access point for the core network (e.g., GGSN) and required bearer information elements (e.g., Bearer, Address, Type of address, Speed, Call type, Authentication type, Authentication id, Authentication password) and a set of Gateway Information (e.g., Address, Type of address, Port, Service, Authentication type, Authentication id and Authentication password). All this information is coded according to the guideline provided in 3GPP TS 23.140 (see 3GPP TS 23.140, Multimedia Messaging Service (MMS); Functional description; stage 2 (Release 5)).

SUMMARY OF THE INVENTION

In an embodiment of the present invention, a method is provided for assigning the priority mechanism to at least one group of TLV-objects for data exchange between the transmitting and receiving entity, for storing data on, and/or for reading data from a storage medium by assigning a priority structure for the TLV-objects in the transmitting and receiving entity and/or on the storage medium.

In an embodiment of the method, the priority structure is expressed by the order of precedence of the TLV-objects.

In an embodiment of the method, the priority structure is defined within the field value of at least one TLV-object.

In an embodiment of the method, the TLV-objects, for which the priority structure was assigned, are different sets of MMS connectivity information.

In an embodiment of the method, the TLV-objects for which the priority structure was assigned, are different sets of interface to core network and barrier bearer information within the value field of at least one interface to core network and bearer TLV-object.

In an embodiment of the method, the priority structure for the TLV-objects is assigned by sequential numbering of the tag values of the TLV-objects.

In an embodiment of the method, the tag values are applied in such away that they are unique in a number of tags of the TLV-objects.

In an embodiment of the method, the TLV-object with the highest priority is of mandatory status.

In an embodiment of the method, the transmitting and/or receiving entity is mobile equipment.

In an embodiment of the method, the selection of bearers for MMS is automatically performed by the mobile equipment based on the assigned priority structure of the TLV-objects.

In an embodiment of the method, the storage medium is a smart card, particularly a SIM, UICC, USIM, WWIM, R-UIM or DIM.

In an embodiment of the method, the storage medium is plugged into user equipment.

Additional features and advantages of the present invention are described in, and will be apparent from, the following Detailed Description of the Invention and the Figures.

BRIEF DESCRIPTION OF THE FIGURES

FIG. 1, consisting of parts 1A and 1B illustrates the storage of MMS connectivity parameters in EFMMSCP as defined in 3GPP TS 31.102 V5.0.0 (Release 5) Characteristics of the USIM Application.

FIG. 3, consisting of parts 3A and 3B, illustrates how the order of precedence for "Interface to Core Network and Bearer Information" is expressed by the order of different sets of MMS Connectivity Information according to the first embodiment of the present invention on a USIM level.

FIG. 5, consisting of parts 5A and 5B, how the order of precedence for "Interface to Core Network and Bearer Information" is expressed by their order within one set of MMS Connectivity Information according to the second embodiment of the present invention on a USIM level.

Like reference signs refer to corresponding parts and elements throughout FIGS. 1 through 5.

DETAILED DESCRIPTION OF THE INVENTION

Figure 2:
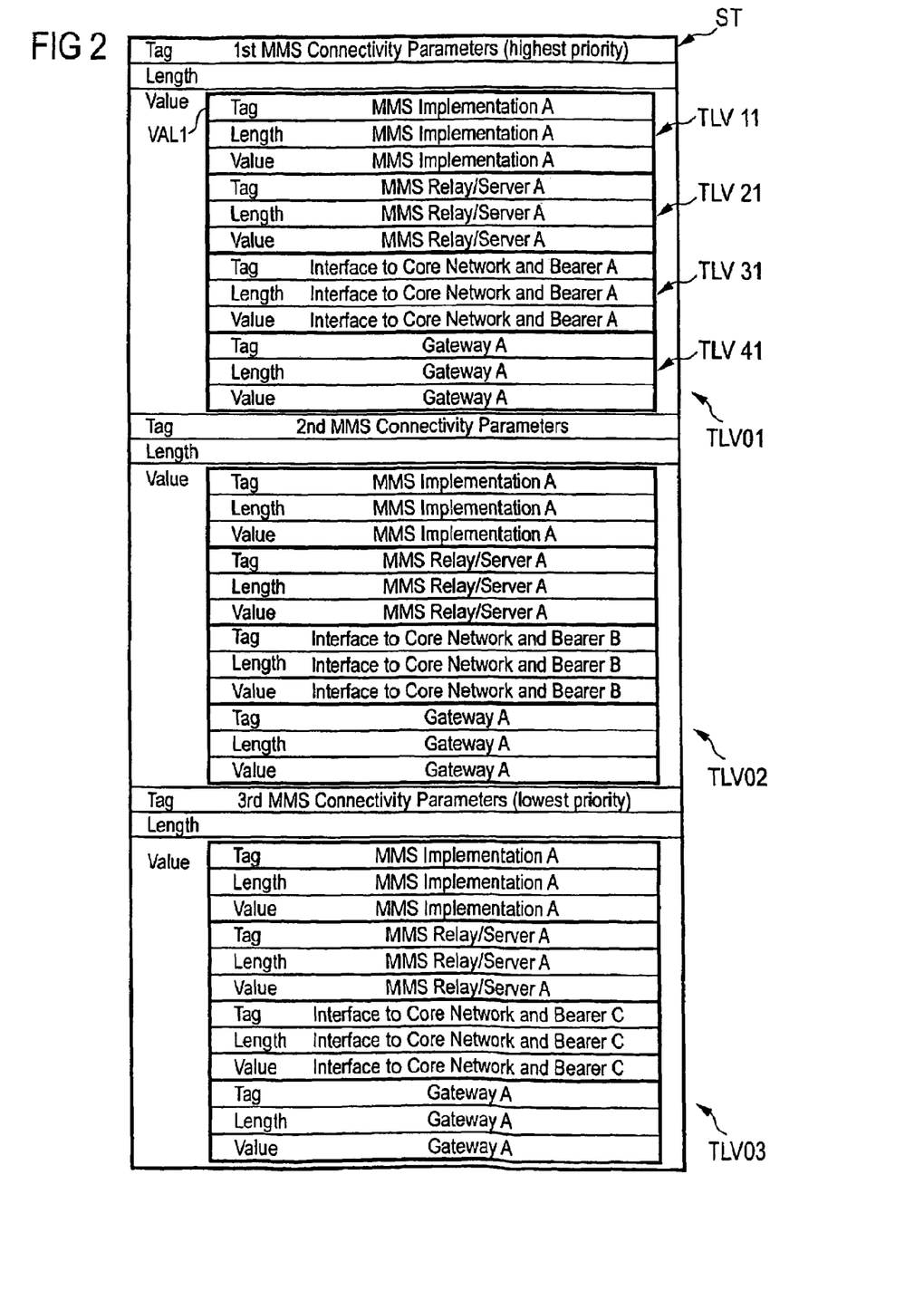
FIG. 2 illustrates how the order of precedence for "Interface to Core Network and Bearer Information" is expressed by the order of different sets of MMS Connectivity Information according to a first embodiment of the present invention.

According to the present invention, the following example is discussed. The mechanisms in this example allow the MMS-capable UE to automatically select a bearer from the Interface to Core Network and Bearer parameters based on their order of precedence as defined on the USIM unless otherwise specified by the user. When automatic selection of bearers is disabled, the user is still able to select a bearer manually from the Interface to Core Network and Bearer parameters. There are two preferable ways to achieve this:

I) The first way to achieve automatic bearer selection is to assign a priority mechanism to MMS Connectivity Parameters sets (see FIG. 2). Several sets (for example, TLVO1-TLVO3 in—FIG. 2) of MMS connectivity parameters can be stored in the EFMMSCP, set 1: 1st MMS connectivity parameters TLV11-TLV41 (tag, length, value), set 2: 2nd MMS connectivity parameters, set 3: 3rd MMS connectivity parameters. All the connectivity parameters sets consist of MMS implementation, MMS Relay/Server, Interface to Core Network and Bearer information and Gateway information. In all these three MMS connectivity parameters sets, the MMS Implementation, the MMS Relay/Server and the Gateway information may be the same (MMS Implementation A, MMS Relay/Server A and Gateway A), only the Interface to Core Network and Bearer information differ from each other (1st MMS connectivity parameters =>Interface to Core Network and Bearer A, 2nd MMS connectivity parameters =>Interface to Core Network and Bearer B, 3rd MMS connectivity parameters =>Interface to Core Network and Bearer C). In general the order of precedence for "Interface to Core Network and Bearer Information" is expressed, respectively assigned by the order of different sets of MMS connectivity Information. For assigning a priority mechanism to at least one group of TLV-objects (for example, TLVO1-TLVO3 in FIG. 2) for data exchange between a transmitting and receiving entity, for storing data on, and/or for reading data from a storage medium, a structure ST is assigned, particularly defined for TLV-objects; for example, TLVO1-TLVO3 in the transmitting and receiving entity, and/or on the storage medium. The priority structure ST is preferably expressed by the order of precedence of the TLV-objects like TLVO1-TLVO3. Thereby, such structure is preferably defined within the value field (e.g., VAL1 in FIG. 2) of at least one TLV-object (e.g., TLVO1). Advantageously, the TLV-objects, for which the priority was assigned, are different sets; e.g., TLVO1-TLVO3 of MMS connectivity information.

In case of automatic bearer selection, the MMS UA will always conveniently select the MMS Connectivity Parameters set with the highest priority; in this example the $1^{st}$ set of MMS connectivity parameters. When the automatic bearer selection is deactivated, the user can select the preferred bearer manually from the list of bearers. In the example according to FIG. 2, the user can choose between the $1^{st}$ set of MMS connectivity parameters, the $2^{nd}$ MMS set of connectivity parameters and the $3^{rd}$ set of MMS connectivity parameters.

Figure 3A:
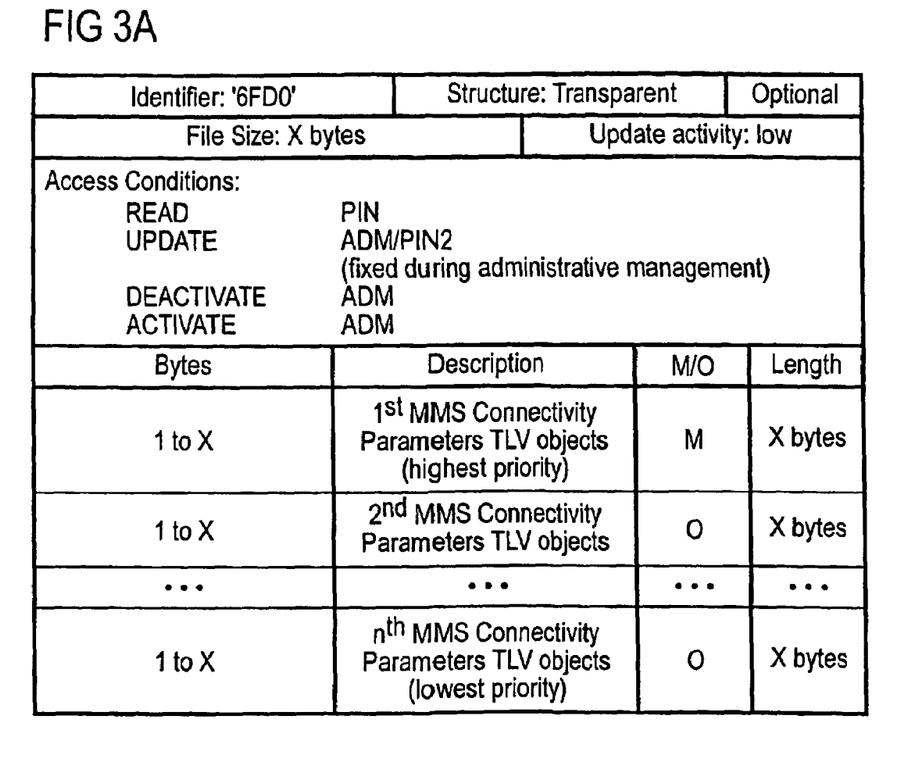
Figure 3B:
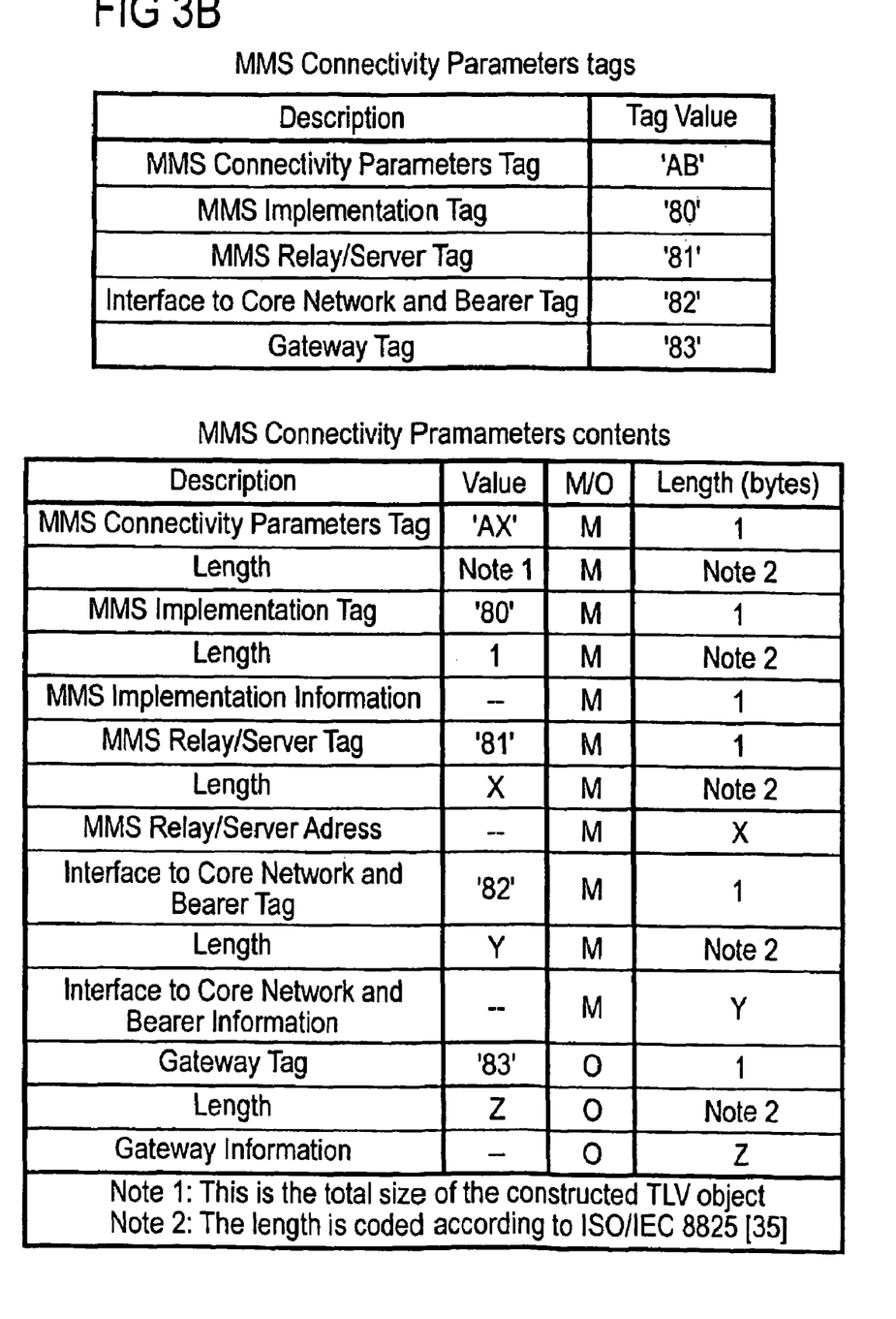

FIG. 3, by way of example, shows how different sets of MMS Connectivity Information can be stored on the USIM and how the order of precedence for Interface to Core Network and Bearer Information can be expressed. Automatic bearer selection can make use of the order of the different sets of MMS Connectivity Information as described above. FIG. 3 illustrates how the order of precedence for "Interface to Core Network and Bearer Information" is assigned, particularly expressed by the order of different sets of MMS Connectivity Information on USIM level: A priority mechanism is assigned to the group of MMS Connectivity Parameters TLV objects: $1^{st}$ MMS Connectivity Parameters TLV objects (highest priority), $2^{nd}$ MMS Connectivity Parameters TLV objects, . . . , $n^{th}$ MMS Connectivity Parameters TLV objects (lowest priority). The way in which the automatic bearer selection based on the order of precedence for Interface to Core Network and Bearer Information works is described above.

Figure 4:
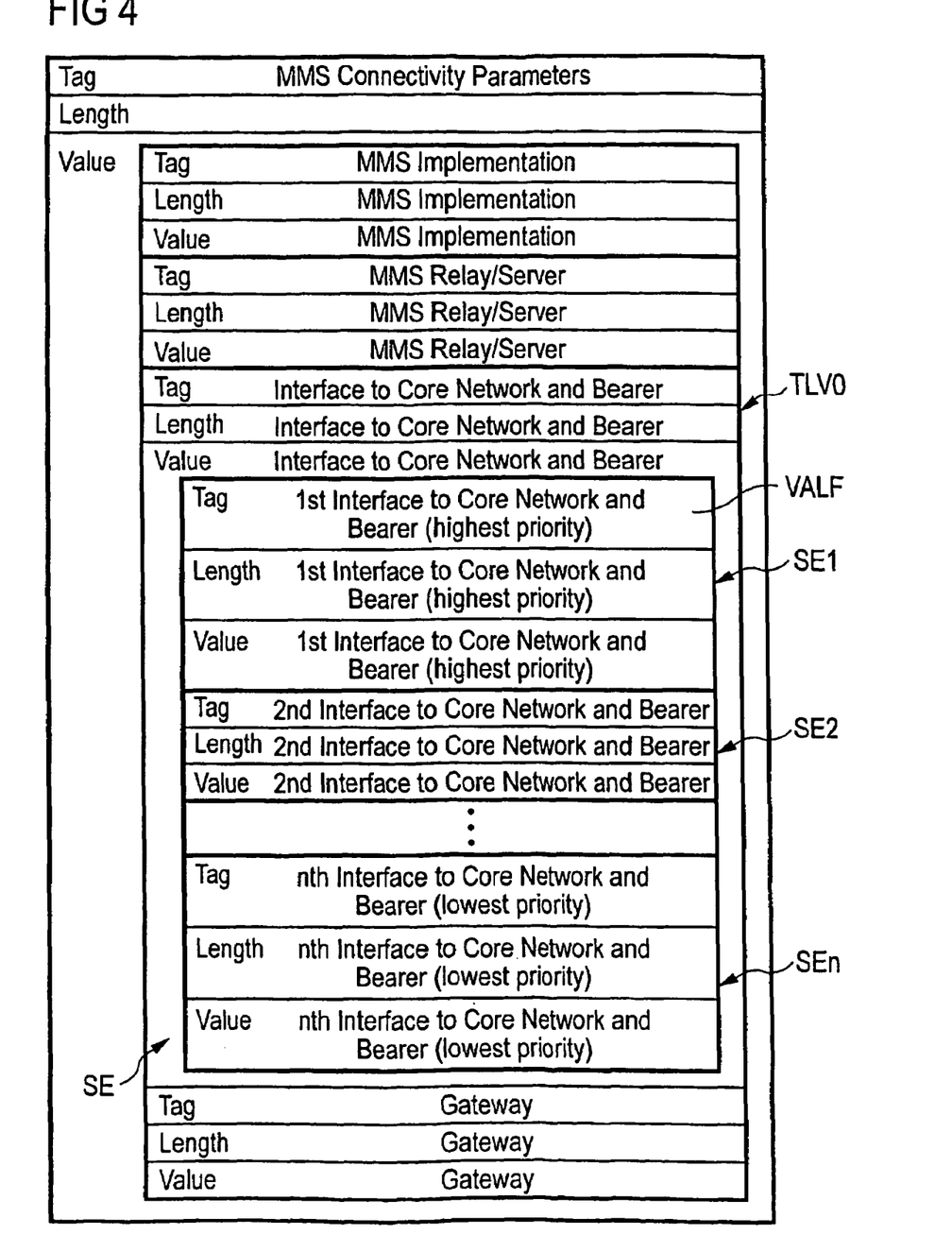
FIG. 4 illustrates how the order of precedence for "Interface to Core Network and Bearer Information" is expressed by their order within one set of MMS Connectivity Information according to a second embodiment of the present invention.

II) Another advantageous way to achieve the storage of different sets of Interface to Core Network and Bearer Information together with precedence information on the USIM for automatic bearer selection is depicted in FIG. 4. The order of precedence for Interface to Core Network and Bearer Information is expressed by their order within one set of MMS Connectivity Information; i.e., the priority mechanism is defined for a list of TLV objects that are the "value" (e.g., VALF) of a TLV object (e.g., TLVO). MMS connectivity Parameters contain MMS implementation, MMS Relay/Server, Interface to Core Network and Bearer information and Gateway information. The Interface to Core Network and Bearer information TLVO may consist of several sets of Interface to Core Network and Bearer information: 1st Interface to Core Network and Bearer information (e.g., SE1); 2nd Interface to Core Network and Bearer information (e.g., SE2), . . . , nth Interface to Core Network and Bearer information (e.g., SEn). Thus, in FIG. 4, the order of precedence for "Interface to Core Network and Bearer Information" is expressed by their order within one set SE of MMS Connectivity Information. In general terms, the TLV-objects, for which the priority was assigned, are different sets (e.g., SE1-Sen) of interface to core network and bearer information within the value field (e.g., VALF) of at least one interface to core network and bearer TLV-object.

In case of automatic bearer selection, the MMS UA will always select the MMS Connectivity Parameters set with the highest priority; in this example, the 1 st set of Interface to Core Network and Bearer Information. When the automatic bearer selection is deactivated, the user can select the preferred bearer manually from the list of bearers. In this example, the user can choose between the 1st set of Interface to Core Network and Bearer information, the 2nd set of Interface to Core Network and Bearer information and the nth set of Interface to Core Network and Bearer information.

Figure 5A:
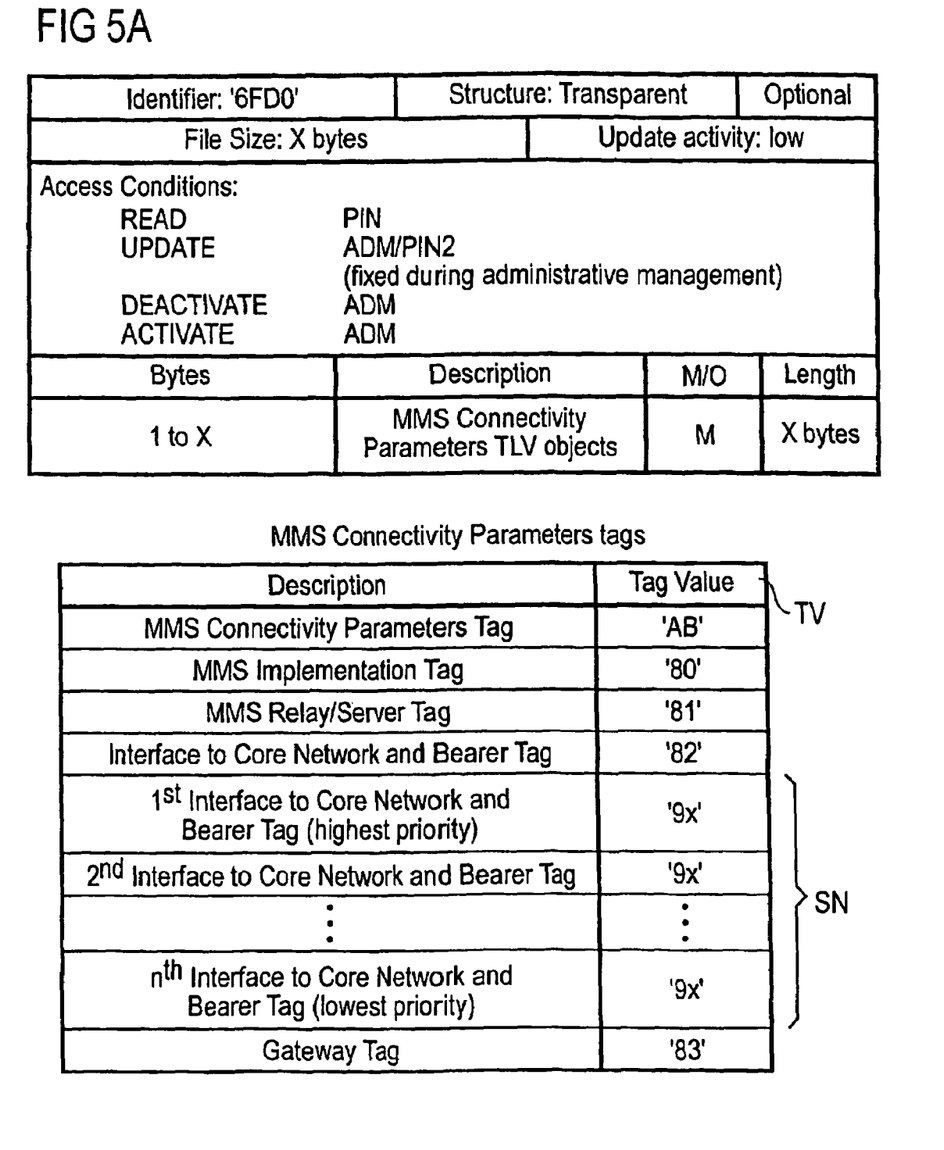

FIG. 5 shows how different sets of Interface to Core Network and Bearer Information can be stored within one TLV object on the USIM and how the order of precedence for Interface to Core Network and Bearer Information can be expressed. Automatic bearer selection can make use of the order of the different sets of the Interface to Core Network and Bearer Information as described above. Particularly in FIG. 5, the order of precedence for "Interface to Core Network and Bearer Information" is expressed by their order within one set of MMS Connectivity Information on the USIM level. Thereby the priority structure for the TLV-objects is assigned by sequential numbering (e.g., SN) of the tag values (e.g., TV) of the TLV-objects. The tag values are applied in such a way that they are unique within the multiple tags of the TLV-objects.

A priority mechanism is assigned within a TLV object dedicated to the Interface to Core Network and Bearer Information; namely $1^{st}$ MMS Interface to Core Network and Bearer Information TLV objects (highest priority), $2^{nd}$ MMS Interface to Core Network and Bearer Information TLV objects, . . . , $n^{th}$ MMS Interface to Core network and Bearer Information TLV objects (lowest priority). The way in which the automatic bearer selection by using the order of precedence for "Interface to Core Network and Bearer Information" work is described above.

For all embodiments, the TLV-object with highest priority is advantageously of mandatory status.

The present invention provides two advantageous, alternative solutions to store different sets of Interface to Core Network and Bearer Information on the USIM in order of precedence as required by 3GPP TSG SA1 and allows the MMS-capable UE to automatically select a bearer from these different sets of Interface to Core Network and Bearer parameters based on their order of precedence unless otherwise specified by the user. When automatic selection of bearers is disabled, the user is still able to select a bearer manually from the sets of Interface to Core Network and Bearer parameters.

An advantage of the mechanisms described herein is that the user's MMS capable terminal can be either configured either automatically (i.e. without any user interaction) with the appropriate bearer based on the order of precedence or manually.

Another advantage is that the mechanisms described herein are independent of the user's particular Mobile Equipment (i.e. mobile phone) at a certain point of time. The priority for the bearer selection mechanisms described is preferably stored on the USIM on the UICC, which can be plugged into Mobile Equipment (=ME) or any apparatus connected to a terminal (user equipment=mobile equipment+storage; e.g., smart card).

For this, preferably provided are:

Mechanisms for automatic and manual bearer selection from the MMS Interface to Core Network and Bearer parameters based on their order of precedence defined on Smart Cards:

a) The order of precedence for Interface to Core Network and Bearer Information expressed by the order of different sets of MMS Connectivity Information.

Definition of a priority mechanism for a group of TLV objects in an EF (Element File) on a smart card; e.g., SIM, UICC, USIM, WIM, R-UIM, DIM, etc.

Functionality of the MMS UA for handling automatic and manual bearer selection (see example(s) of the present invention according to FIG. 2-5).

b) The order of precedence for Interface to Core Network and Bearer Information is expressed by their order within one set of MMS Connectivity Information.

Definition of a priority mechanism for a group of TLV objects within one (constructed) TLV object in an EF on a smart card; e.g., SIM, UICC, USIM, WIM, R-UIM, DIM, etc.

Functionality of the MMS UA for handling automatic and manual bearer selection (see example(s) of the present invention according to FIGS. 2-5).

Further, the mechanisms to assign priority to TLV objects as described herein can be applied to any application that makes use of TLV objects. The mechanisms to assign priority to TLV objects also can be used for other general purposes where TLV objects are used.

Further, the automatic and manual selection mechanisms of prioritized TLV objects as described herein are not restricted to the purpose of storing "Interface to Core Network and Bearer Information" on the USIM. The mechanisms can be applied to any application that makes use of TLV objects as well. The automatic and manual selection mechanisms also can be used for other general purposes where TLV objects are used.

Although the present invention has been described with reference to specific embodiments, those of skill in the art will recognize that changes may be made thereto without departing from the spirit and scope of the present invention as set forth in the hereafter appended claims.

The present invention particularly makes use of the following references:

[1] 3GPP TS 31.102 V5.0.0 (Release 5), Characteristics of the USIM Application

[2] 3GPP TS 23.140, Multimedia Messaging Service (MMS); Functional description; stage 2(Release 5)

[3] W. Rankl, W. Effing, Smartcard Handbook, John Wiley & Sons, second edition, 2000.

[4] 3GPP TS 22.140, Multimedia Messaging Service (MMS); Service Aspects; Stage 1 (Release 5)

The invention claimed is:

1. Multimedia Messaging Service (MMS) capable mobile equipment comprising:
   a) an elementary file containing values for a set of Multimedia Messaging Connectivity Parameters, which can be used by the MMS capable mobile equipment for an MMS network connection;
   b) the elementary file being a transparent file which is present only, if a Multimedia Messaging Service is available wherein, the MMS contains at least one set of Multimedia Messaging Connectivity Parameters;
   c) the set of Multimedia Messaging Connectivity Parameters being stored, by making use of a Tag, Length, Value (TLV) object structure, in an MMS Connectivity TLV object, including at least the following objects:
      an MMS Implementation TLV object indicating which implementation is used for the Multimedia Messaging Service,
      an MMS Relay/Server TLV object containing the address of an associated MMS relay/server,
      an Interface to Core Network and Bearer Information TLV object to set up a bearer including at least: Bearer, Address, Type of address, Speed, Call type, Authentication type, Authentication id, and Authentication password,
      a Gateway TLV object including at lest one of Address, Type of address, Port, Service, Authentication type, Authentication id, and Authentication password;
   d) wherein the set of Multimedia Messaging Connectivity Parameters includes at least one Interface to Core Network and Bearer information TLV object, one MMS Implementation TLV object, one MMS Relay/Server TLV object, and one Gateway TLV object; and
   e) wherein an order of the at least one Interface to Core Network and Bearer information TLV object in the MMS Connectivity TLV object defines the priority of Interface to Core Network and Bearer information, with a first Interface to Core Network and Bearer information TLV object having a highest priority.

2. Multimedia Messaging Service capable mobile equipment according to claim 1, wherein the TLV object with the highest priority is of mandatory status.

3. Multimedia Messaging Service capable mobile equipment according to claim 1, comprising a storage medium on which the elementary file for Multimedia Messaging Connectivity Parameters is stored.

4. Multimedia Messaging Service capable mobile equipment according to claim 3, wherein the storage medium includes a smart cardselected from a set of smart cards including a UMTS subscriber identity module (USIM), SIM, WIM, R-UIM, and DIM.

5. Multimedia Messaging Service capable mobile equipment according to claim 4, wherein the UMTS subscriber identity module is on a Universal Integrated Circuit Card (UICC).

6. Multimedia Messaging Service capable mobile equipment according to claim 5, wherein the mobile equipment is user equipment plugged into a UICC.

7. Multimedia Messaging Service capable mobile equipment according to claim 1, wherein a plurality of Multimedia Messaging Connectivity Parameters are stored in the elementary file.

8. Multimedia Messaging Service capable mobile equipment according to claim 7, wherein the plurality Multimedia Messaging Connectivity Parameters contain one Interface to Core Network and Bearer information TLV object.

9. Multimedia Messaging Service capable mobile equipment according to claim 8, wherein an order of the MMS Connectivity TLV objects on a level of a UMTS subscriber identity module define a priority of the Interface to Core Network and Bearer information, with the Interface to Core Network and Bearer information TLV object in the first MMS Connectivity TLV object having the highest priority.

10. Method for selection of a bearer, wherein a Multimedia Messaging Service capable mobile equipment according to claim 1 automatically selects the bearer which is described by the Interface to Core Network and Bearer information stored in the Interface to Core Network and Bearer information TLV object with the highest priority.

11. Method according to claim 10, wherein a user selects a preferred bearer manually if the bearer is not selected automatically.

12. Method for selection of a bearer, wherein a Multimedia Messaging Service capable mobile equipment according to claim 1 automatically selects the bearer which is described by the Interface to Core Network and Bearer information stored in the Interface to Core Network and Bearer information TLV object with the highest priority.

13. Method for selection of a bearer, wherein a Multimedia Messaging Service capable mobile equipment according to claim 3 automatically selects the bearer which is described by the Interface to Core Network and Bearer information stored in the Interface to Core Network and Bearer information TLV object with the highest priority.

14. Method for selection of a bearer, wherein a Multimedia Messaging Service capable mobile equipment according to claim 4 automatically selects the bearer which is described by the Interface to Core Network and Bearer information stored in the Interface to Core Network and Bearer information TLV object with the highest priority.

15. Method for selection of a bearer, wherein a Multimedia Messaging Service capable mobile equipment according to claim 5 automatically selects the bearer which is described by the Interface to Core Network and Bearer information stored in the Interface to Core Network and Bearer information TLV object with the highest priority.

16. Method for selection of a bearer, wherein a Multimedia Messaging Service capable mobile equipment according to claim 6 automatically selects the bearer which is described by the Interface to Core Network and Bearer information stored in the Interface to Core Network and Bearer information TLV object with the highest priority.

17. Method for selection of a bearer, wherein a Multimedia Messaging Service capable mobile equipment according to claim 7 automatically selects the bearer which is described by the Interface to Core Network and Bearer information stored in the Interface to Core Network and Bearer information TLV object with the highest priority.

18. Method for selection of a bearer, wherein a Multimedia Messaging Service capable mobile equipment according to claim 9 automatically selects the bearer which is described by the Interface to Core Network and Bearer information stored in the Interface to Core Network and Bearer information TLV object with the highest priority.

19. Method for selection of a bearer, wherein a Multimedia Messaging Service capable mobile equipment according to claim 9 automatically selects the bearer which is described by the Interface to Core Network and Bearer information stored in the Interface to Core Network and Bearer information TLV object with the highest priority.

* * * * *

UNITED STATES PATENT AND TRADEMARK OFFICE
CERTIFICATE OF CORRECTION

| | |
|---|---|
| PATENT NO. | : 7,386,300 B2 |
| APPLICATION NO. | : 10/514651 |
| DATED | : June 10, 2008 |
| INVENTOR(S) | : Josef Laumen et al. |

It is certified that error appears in the above-identified patent and that said Letters Patent is hereby corrected as shown below:

On the Title page Item (30) Please insert the Foreign Application Priority Date as follows:

--May 15, 2002........................(DE).......................02010846.0--

Column 1, Line 4 Please insert the following:

--CROSS REFERENCE TO RELATED APPLICATIONS

This application is a U.S. national stage application of International Application no. PCT/EP03/04753, filed May 6, 2003, which designates the United States of America, and claims priority to EP application no. 02010846.0, filed May 15, 2002, the contents of which are hereby incorporated by reference in its entirety.--

Signed and Sealed this

Seventh Day of December, 2010

David J. Kappos
*Director of the United States Patent and Trademark Office*